United States Patent [19]

Welch

[11] Patent Number: 5,533,760
[45] Date of Patent: Jul. 9, 1996

[54] METHOD AND DEVICE FOR CONTAINING FLUIDS

[75] Inventor: James G. Welch, Houston, Tex.

[73] Assignee: Shell Oil Company, Houston, Tex.

[21] Appl. No.: 264,824

[22] Filed: Jun. 23, 1994

[51] Int. Cl.⁶ .................................................. F16L 55/00
[52] U.S. Cl. .......................... 285/14; 285/15; 138/94.3; 137/312
[58] Field of Search ............................ 285/13, 14, 15, 285/16, 47; 138/94.3; 137/312, 377

[56] References Cited

U.S. PATENT DOCUMENTS

| | | | |
|---|---|---|---|
| 798,649 | 9/1905 | Willink | 285/13 |
| 2,766,614 | 10/1956 | Cook | 285/13 X |
| 2,954,797 | 10/1960 | Dryer | 285/13 X |
| 3,068,026 | 12/1962 | McKamey | 285/47 |
| 3,310,322 | 3/1967 | Carroll | 285/18 |
| 3,335,740 | 8/1967 | Anderson | 137/377 |
| 3,506,039 | 4/1970 | Marriott . | |
| 4,271,870 | 6/1981 | Butler et al. | 285/15 X |
| 4,452,372 | 6/1984 | Robbins . | |
| 4,664,428 | 5/1987 | Bridges . | |
| 4,930,544 | 6/1990 | Ziu . | |
| 5,141,256 | 8/1992 | Ziu | 285/13 |
| 5,201,344 | 4/1993 | Lacouture . | |
| 5,282,654 | 2/1994 | Hendrickson . | |
| 5,286,064 | 2/1994 | Bridges . | |
| 5,312,137 | 5/1994 | Nee | 285/15 X |
| 5,413,385 | 5/1995 | Hilbush | 285/293 X |

FOREIGN PATENT DOCUMENTS

| | | |
|---|---|---|
| 0226564 | 6/1987 | European Pat. Off. . |
| 2389067 | 12/1978 | France ........................... 285/14 |

OTHER PUBLICATIONS

Foreign Search Report dated Oct. 11, 1995.

*Primary Examiner*—Dave W. Arola
*Attorney, Agent, or Firm*—Todd F. Volyn

[57] ABSTRACT

An apparatus and method for containing fluid about sections of joined fluid vessels is presented. The apparatus and method incorporate the use of a vessel wrapping substantially enclosing the area between the vessel sections so that substances carried by the vessel are contained by the wrapping when the sections are separated. The wrapping is secured to the sections of joined vessel and substances contained by the vessel wrapping when the sections are separated.

8 Claims, 1 Drawing Sheet

METHOD AND DEVICE FOR CONTAINING FLUIDS

FIELD OF THE INVENTION

The invention relates to the containment of fluids about joined sections of pipe or other fluid vessels. More particularly, this invention relates to the avoidance of environmental mishaps that might otherwise occur during maintenance of vessels used to transport fluids.

BACKGROUND OF THE INVENTION

Oil refineries, pipelines, chemical plants and other facilities that require the transport of fluids can have miles of interconnected pipes and tubing. As fluids are caused to go from one operation or outlet to another, pipes must be fitted with various fittings, connected to various outlets and devices, and connected to other pipes and tubing. Oil refineries are archetypical of the wide range of ways in which such connections can be arrayed.

In an oil refinery, hydrocarbon fluids are often sent from process to process under varying pressures and flow rates. Thus, it is not uncommon to incorporate miles of pipes in a range of diameters. Some sections of such pipe can exceed six feet in diameter while others are far less than a one foot in diameter. Typically such pipes are made of thick steel or iron. Connecting these pipes to the various devices that will receive the fluids is most often accomplished by butting a flanged end of one pipe to a flanged end of another pipe or device. The two flanges are then usually bolted together.

Maintenance of a unit to which a pipe is connected or to a pipe itself ordinarily requires one to unbolt the flanges and separate the pipes. It is a common practice to place a blind or blank over the end of the pipe or vessel that will not be involved in the maintenance. The blind is usually bolted to the flange on that pipe. This prevents fluid that is flowing through that pipe from spilling or leaking and prevents contaminants from entering the pipe. Unfortunately, current practice does not provide for preventing the spillage of fluids that is present in the lines prior to the insertion of the blind. Determining whether or not fluid is in such a line and will spill out upon disconnecting of the flanges is primarily a matter left to guesswork. Poor judgments in this regard can result in environmental mishaps.

One might suspect that placing a collection pan under the potential spill could assist in avoiding such spills. However, the amount of draining fluid, the awkwardness of the method, and potential impact of other factors such as wind gusts show that such a technique is still subject to considerable error. Furthermore, pipes and other vessels sometimes carry fluids under pressure. Simply disconnecting such a pipe would result in that fluid being spewed out of the pipe juncture. This could injure workers and/or release toxic materials into the environment. Add to this the trend in environmental laws and regulations to strictly limit the amount of leakage or spillage that can occur and one can see the impetus for a new technique. Where small spills of material such as oil and other hydrocarbons may once have been acceptable this is no longer the case. Even very small spills must typically be reported to governmental agencies, often under the threat of sanctions.

Double-containment strategies have been used generally to contain pipes and other vessels. Essentially, these systems consist of a housing or outer pipe that is fitted over the pipe that may leak. These systems are designed to encase entire sections of pipe without regard for one's ability to perform maintenance on the pipe or its fitting. They are designed to contain spills in static systems. That is, one must ordinarily remove the secondary containment device to gain access to a joint or other section of pipe. U.S. Pat. No. 4,930,544 describes a double-containment thermoplastic pipe assembly which encases a section of pipe to include fittings thereon. The device may contain leaks but is not designed to enable the performance of work at the junction of two joined sections of pipe or other vessel while containing fluids that would otherwise leak from them.

New methods and devices for avoiding spills and leaks from vessels while performing maintenance on pipes and vessels are in great demand. This is particularly true when such maintenance involves disconnecting pipe junctions or joints. Advances in this area would materially enhance the quality of the environment by preventing the air, water, and soil from being fouled.

SUMMARY OF THE INVENTION

It is an object of the invention to provide a device useful in preventing environmental mishaps.

It is a further object of the invention to provide a device for containing fluids flowing through joined vessels.

It is a yet further object of this invention to provide a device and method for enabling maintenance operations on joined vessels without leakage of the contents of those vessels.

It is a yet further object of this invention to provide devices and methods for preventing leaks and spills from pipe connections while the pipes are being disconnected.

In accordance with these and other objects of the invention, a device for containing fluids within a section of joined fluid vessel is provided. The device has a vessel wrapping which substantially encloses the area between vessel sections so that substances carried in them are contained upon separation of the sections. The wrapping is secured to the vessel sections by a fastener and the wrapping has a means for removing substances contained by it.

This device may generally conform in shape to the outer perimeter of the joined section of the vessel. At least a portion of the inner surface of the device is in contact with the outer surface of each of the joined ends of the vessel to be contained along the entire perimeter of the joined section.

In a preferred embodiment of the invention the device is made of a flexible material so that as the joined section of vessel are decoupled thereby causing the distance between the joined section to widen, the device is expanded and still contains the space between the sections.

In another embodiment of this invention, a method for containing spills from the interstice between two joined section of fluid vessel is provided. The method involves fastening a connector between the two joined sections, disconnecting the sections, and voiding the area contained by the connector.

DETAILED DESCRIPTION OF THE PREFERRED EMBODIMENTS

New devices and methods have been developed for containing the contents of joined sections of fluid vessels. These devices and methods are particularly useful in containing the area between the sections when the sections are disconnected. The devices and methods seal the area around the joined surfaces but leave exposed that portion of joined area over which there must be access. Such areas typically include the nuts and bolts securing fastened flanges. These new methods and devices can be practiced and fashioned so that intermediate containment strategies such as the placement of blinds over orifices and the extraction of contained fluid can be practiced concomitantly.

Figure 1:
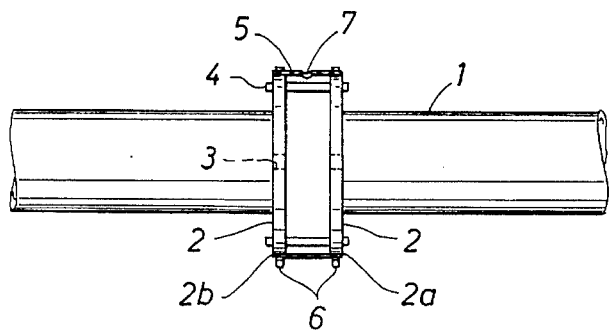
FIG. 1 is a perspective view, in partial cross-section, of a device according to this invention as it contains two sections of pipe in the process of being disconnected or decoupled at the interface of two flanges.

Turning now to the drawings, FIG. 1 shows a typical juncture of two sections of fluid vessel during the course of separating the vessels. Here, the fluid vessels are pipes 1. At each end of the pipe 1 a flange 2 is affixed. Holes 3 are bored into each flange so that the flanges can be bolted together by bolts 4 or other fasteners. Ordinarily, when the pipes are butted together and fastened, fluid runs through the pipes. For example, a product of one reaction may be transported for use as a reactant in another reactor through such an array. Oil and gas refineries can have miles of such pipe sections joined at any number of points. Directing the course of such fluid flow is ordinarily accomplished by means of a bent or directed joint coupled to a straight section of pipe in the manner outlined here.

Pipes such as those shown here may need to be decoupled or disconnected for any number of reasons. This is done by unfastening or loosening the bolts 4 and separating the pipe sections. When this occurs there is initially a small separation between the joined sections of vessels as shown. Any fluid or other remnant substance would ordinarily leak or spill onto the ground or other equipment beneath the vessel.

One such occasion for disconnecting such vessels is when a reactor must be serviced and cooled. Typically, the pipes running to the reactor are disconnected at any number of points so that coolants may be injected into the reactor. It is common practice to place a blind over the section of disconnected pipe to which no service is to be performed until such time as access to that section is needed. A blind is a piece of material which covers the entire cross section of an open section of pipe or other vessel.

Typically, a blind is constructed from the same or similar material as the pipe it encloses and is of slightly greater circumference. It is fastened to the pipe in the same manner as the flange of the opposing pipe section. Other inserts may also be secured to the vessel juncture in this way. These can comprise, for example, inserts having a smaller annular opening than the original pipe placed therein to conduct other servicing operations.

An embodiment of this invention involves the placement of a vessel wrapping 5 around the area comprising the interface of the pipe sections/flanges. The terms vessel wrapping and wrapper as used throughout this specification have the same meanings and may be used interchangeably. The purpose of the wrapping is to act as a medium for collecting fluids or other substances which are remnants or have settled in the vessel. The area which the wrapping must encompass is variable and depends upon how much fluid must be collected and the size of the vessel. The safest option and the best mode for practicing this invention is to completely enclose the area surrounding the juncture of the joined vessels so that the area is substantially hermetically sealed. However, it is possible to leave a section of the top (that portion of the vessel pointing away from the ground) of the wrapper open for observation. This may be desirable when only a small amount of remnant is expected to be in the vessel at the time of disconnecting. Accordingly, the wrapper can be fashioned so that it substantially surrounds the area between the joined sections.

The vessel wrapping is made of a material which is impermeable to the fluid flowing through the vessel during the period in which the wrapping is used to contain the areas described above. Typically, the time involved in such operations is a relatively short period of several minutes to several hours. However, it can be considerably longer. Indeed, it is possible to leave such devices in place if the wrappers are made of sufficiently durable material as outlined below.

In most cases, the time period in question is almost instantaneous. That is, the flow of fluids is stopped and a small amount of fluid is left in the vessel which must be collected at the time in which the vessel connections are disconnected. Ordinarily, after this occurs, no further fluid or other remnant need be collected by virtue of the cessation of operations and/or the use of blinds.

In the most preferred embodiment, this invention is used to contain hydrocarbons which flow through pipes in an oil refinery. Thus, the vessel wrapping in this case should be impermeable to hydrocarbons during the period in which the pipes are detached and fluid remnants are to be removed from the pipe. Most metals and high density polymers such as high density polyethylene (HDPE) are suitable for such purposes and can even be left in place for long period of time. However, it should also be recognized that even degradable substances may be used if the period of their use is short. Thus, for example, a stretchable latex can be used as the wrapper for maintenance jobs of short duration such as where the pipes are to be disconnected and then sealed within an hour or two. Of course, the wrapper selected must not degrade at the temperatures of the pipe or vessel during the time it is being serviced or enclosed.

Another consideration in selecting the substance for use as the wrapper is the distance over which the coupled or joined vessels must be separated. The wrapper should be of sufficient dimensions so that it collects all of the remnant fluid that could leak or spill when the vessels are at their maximum distance apart while the remnant is present. This can be addressed in a number of ways. A rigid material such as steel tubing or HDPE can be formed so that its length (distance spanning the transverse axis in the typical case of a cylinder/pipe) corresponds to this maximum separation distance. Alternatively, such a rigid material can be fashioned so that it is expandable through a series of telescoping sections of wrapping. The most preferred wrapping incorporates an expandable material that stretches as the joined sections are disconnected. A relatively impermeable polymer such as a polydimethylsiloxane is suitable for such a purpose. A series of wire ribs or similar structural members can be formed into such a wrapper at the time it is produced so that the expandable material is also collapsible. In this way, the wrapper takes up a small area when fastened to the joined section of vessel and expands in an accordion like fashion upon separating the sections.

The wrapper 5 must be affixed to the ends of the sections at their juncture. In the embodiment shown in FIG. 1, this is at the flanges 2. In a most preferred embodiment this involves covering the entire exposed edge of each of the joined flanges so that the flange faces are completely enclosed upon separation of the sections. One method involves the use of clamps 6 placed over the wrapper and then tightened about the flange. Ordinary pipe or band clamps such as those which are commonly used to secure hoses to pipe are suitable for this purpose as are snap rings.

Another type of fastener that can be used are the hook and loop type fasteners such as those sold under the trademark of "VELCRO" by the Velcro Corporation. When the wrapper is made of a flexible, expandable material such fasteners can be incorporated directly into or onto the surface of the wrapper. This can be done by bonding an area of hook surfaces to the inner surface of the wrapper with the corresponding or complementary loop surfaces bonded to the outer surface of the wrapper. Of course, the surfaces of the wrapper to which the fastening surfaces are affixed can also be the opposite as those just described. The hook and loop surfaces can be so incorporated into the wrapper surfaces so that they occupy all or just a small portion of the wrapper surfaces. In any event, securing the wrapper to the vessel in such a configuration would merely require one to wrap the wrapper over the vessel juncture so that a portion of the wrapper overlapped itself. This would cause the hook and loop surfaces to link thereby affixing the wrapper to the vessel juncture.

It is also possible to secure the wrapper to the joined sections with an adhesive. Such an adhesive could be applied to the surface of the wrapper or to the vessel itself. Adhesive applied to the wrapper can be covered with a removable surface so that one need only remove the surface to expose the adhesive and lay the wrapper over the vessel. If a strong adhesive is used, a corresponding adhesive solvent may be necessary to remove the wrapper when desired.

The wrapper 5 should be positioned so that it does not inhibit access to fasteners 4 used to join the vessel sections. This is most easily accomplished by affixing the wrapper directly to the flanges so that the outer edges of the wrapper extend no farther than the corresponding outer flange edges 2a. In some instances it may be desirable to affix the wrapper to the vessel itself. In such a case, the outer edges of the wrapper would extend past the flange edges. Access to the fasteners can be obtained through the placement of accessways or holes cut into the wrapper corresponding to the position of nuts and bolts on the flanges.

In employing the apparatus and method of this invention, one is not only concerned with collecting the remnant or fluid that collects in the vessel. Removal of the fluid without leaking or spilling it must also be accomplished. This can be facilitated by the use of an accessway or removal means 7 that is formed as part of the wrapper itself or is affixed to it. In the case in which the top of the wrapper is open, this opening can serve as an access to the introduction of a suction means, a thief pump, or other commonly used device to remove fluids. Another removal means comprises the insertion of a small portal in the upper (the portion of the wrapper not directly or indirectly facing the ground) portion of the wrapper. This can simply be a small hole. More preferably, it consists of a small hole covered by an easily punctured membrane. The membrane remains sealed until remnant removal is desired. At this point it is punctured with an instrument such as a screwdriver and a device for removing remnants such as a piece of tubing connected to a pump is inserted.

Figure 2:
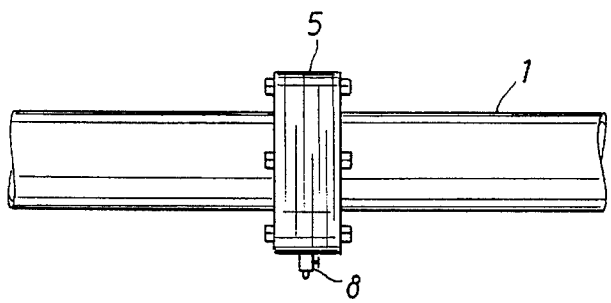
FIG. 2 is a perspective view of a device according to this invention having a valve therein for removal of residual fluid or other remnants in the vessel.

FIG. 2 shows a most preferred embodiment in which a valve 8 is incorporated into the wrapper 5. This valve can be opened so that there is communication between the area enclosed by the wrapper and the area external to it. Opening the valve would allow drainage into another collection means such as a drum. A valve over which a suction device such as a pump can be directly placed can also be used. In this way, the pump can be engaged so that rapid evacuation of the area contained by the wrapper is achieved.

To accomplish remnant/fluid removal, one first secures the wrapper to the vessel sections as described above. The fasteners used to join the vessel sections are then loosened or removed. The removal means or accessway is used as described above and the remnant/fluid is evacuated. Once the fluid is completely removed without undue risk of a leak or spill, the wrapper is removed from the vessel so that further maintenance or other work can be conducted on it. Determining when remnant has been removed can be accomplished through inspection such as observation through a portal or by inspection of the materials being withdrawn from the vessel. An absence of fluid would usually indicate that all of the fluid has been withdrawn from the wrapper. Alternatively, fluid sensors can be incorporated. This can be as simple as placing a dip stick into the accessway or portal or can be accomplished through the use of electronic sensors so emplaced.

Figure 3:
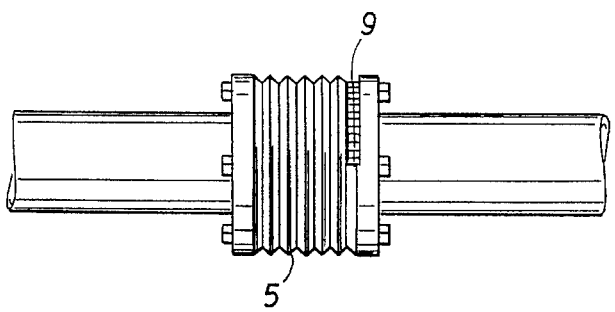
FIG. 3 is a perspective view of a device according to this invention having an entryway for the introduction of a blind or for otherwise gaining access to the interior of the containment wrapping.

It is sometimes desirable to place a blind over a section of pipe before removing the wrapper. Another embodiment of this invention further facilitates such practices. FIG. 3 shows an embodiment of the invention wherein the wrapper 5 completely encases the area about the joined sections. The wrapper has an entryway 9 in its top portion large enough to place a blind through it. Ordinarily, this entryway is positioned longitudinally about the top portion of the wrapper. The term longitudinally is used with reference to the embodiment of this invention wherein the shape of the vessels contained is cylindrical such as with pipe. It will be appreciated by those skilled in the art that similar placement of the entryway can be easily analogized for vessels having noncylindrical shapes.

The entryway 9 is ordinarily sealable. Any common means for sealing a slit in fabric can generally be used for this purpose. Such means include without limitation, zippers, hook and loop fasteners, and puncturable membranes. In such a configuration one can affix the wrapper to the vessel, disconnect or decouple the vessel, open the entryway, insert the blind, fasten the blind to an end of the section, detach the wrapper, and complete fastening of the blind. Removal of remnant/fluid can be accomplished before or after the insertion of the blind as described above.

Blinds can be placed between the juncture of two sections of pipe at the time that the sections are joined. This can be done so that the blind is readily accessible when the flanged is disconnected and is a common practice in many refineries. A device according to this invention can be fashioned to accommodate such an arrangement. In such a case, the wrapper 5 as shown in FIG. 3 has slit 9 therein. The wrapper is placed over the juncture of the pipes or vessels as previously described and the blind is threaded through the slit 9. The slit is made so that overlapping material is present on each of the edges of the slit. When the wrapper is emplaced, the material that would otherwise overlap is pushed against the sides of the blind so that it is sealed all about the portion that protrudes through the slit. One can also place adhesives or other fastening material such as hook and loop fasteners on the edges of the slit. When the wrapper is emplaced and the material around the protruding section of the blind is formed around it, those portions of the edges of the slit which contact each other form a seal.

Figure 4A:
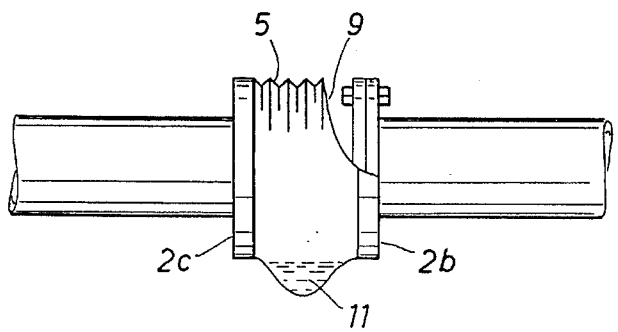
FIG. 4a is a perspective view of a device according to this invention having an accessway for the introduction of one or more blinds.
Figure 4B:
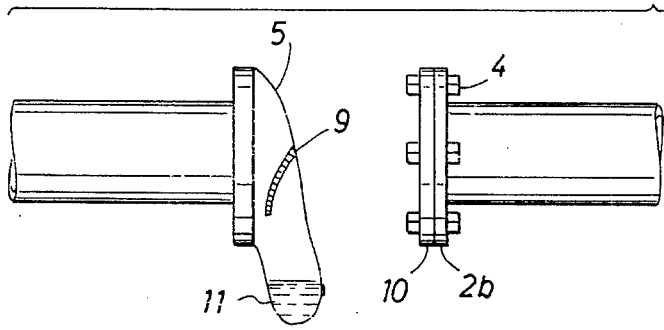
FIG. 4b is a perspective view of a device according to this invention wherein remnant fluid can be contained in the device while a section of vessel previously joined to anther section of the vessel is blinded.

FIGS. 4a and 4b show another embodiment of the invention wherein the blind is inserted before removing the wrapper. In this embodiment, the wrapper 5 is a very flexible material such as an artificial rubber. Further, it has the entryway (not shown in this figure) shown in FIG. 3 and is preferably comprised of excess material so that a substantial portion of the wrapper sags below. However, it need not have the removal means such as the means 8 shown in FIG. 2 because the wrapper itself can comprise the removal means.

In FIG. 4a, blind 10 is inserted through the entryway 9. The top portion of the blind is connected to the top portion of the flange 2 by means of the bolt and nut 4 that had previously been used to join the flanges. In this case, the entryway 9 is rather large when fully opened (up to about ⅔ the circumference of the flange) to allow for fastening at least a portion of the blind to the flange. Fluid 11 fills the sagging bottom portion of the wrapper. This is the fluid that is captured by the wrapper upon loosening the connected pipes. Once the blind is at least partially secured to the flange, the entryway 9 is preferably sealed.

FIG. 4b shows a further aspect of the embodiment shown in FIG. 4a. Here, the blind 10 has been partially secured to the flange 2b. The wrapper has then been sealed by closing a zipper comprising the entryway 9. Fluid 11 is contained in the sagging portion of the wrapper. The end of the wrapper that had been affixed to flange 2b has been detached and sealed by tying it off or through the use of sealing means as described for above for the entryway. The other end of the wrapper remains affixed to the other flange 2c. One can then grasp the wrapper so that fluid does not spill or pour back into the vessel and then remove the wrapper from flange 2c. The fluid or other remnant is thus all contained in the wrapper which now has the appearance roughly similar to a bag. Fluid and wrapper can then be properly disposed or reused.

I claim as my invention:

1. An apparatus for containing fluid about sections of joined fluid vessels comprising:

A vessel wrapping, said wrapping substantially enclosing the area between said vessel sections so that substances carried by said vessel are contained by said wrapping upon separation of said sections;

a means for securing said vessel wrapping to said sections of joined vessel, and a portal for removing substances contained by said vessel wrapping, said portal being fixed to said vessel wrapping and wherein said portal is sealable by a fastener selected from the group consisting of zippers, hook and loop fasteners, and membranes.

2. The apparatus of claim 1 wherein said portal is a puncturable membrane.

3. An apparatus for preventing fluid spillage from sections of joined vessels comprising:

an expandable vessel wrapper having ends affixable to each of said joined sections of vessel, said vessel further having a blind insertion means formed therein, and a fastener for affixing said vessel wrapper to the outer surface of said fluid vessels, said faster affixed to said wrapper.

4. The apparatus of claim 3 wherein said wrapper substantially encloses the space between said sections of vessel during the disconnecting of said sections.

5. The apparatus of claim 4 wherein said wrapper encloses a blind placed through said blind insertions means and affixed to a section of vessel.

6. The apparatus of claim 4 wherein said blind insertion means is a sealable portal.

7. A method of containing fluids during decoupling of joined fluid vessel sections comprising:

enclosing the area between the ends of joined vessel sections with a vessel wrapper having a blind portal therein;

decoupling said joined vessel sections so that said vessel sections have an open portion therein;

inserting a blind through said blind portal;

fastening said blind to said vessel so that it covers said open portion of said vessel;

capturing fluid remaining in said vessel sections in said vessel wrapper; and sealing said vessel wrapper.

8. The method of claim 7 further comprising the step of removing said fluid from said vessel wrapper by means of a vacuum.

* * * * *